G. B. GARDNER.
RAKE CLEANING ATTACHMENT.
APPLICATION FILED JAN. 9, 1915.

1,136,002.

Patented Apr. 20, 1915.

Witnesses:
H. B. Davis.
Clara L. Erickson.

Inventor:
Geo. B. Gardner

UNITED STATES PATENT OFFICE.

GEORGE B. GARDNER, OF HAVERHILL, MASSACHUSETTS.

RAKE-CLEANING ATTACHMENT.

1,136,002. Specification of Letters Patent. Patented Apr. 20, 1915.

Application filed January 9, 1915. Serial No. 1,296.

*To all whom it may concern:*

Be it known that I, GEORGE B. GARDNER, a citizen of the United States, residing at Haverhill, in the county of Essex and State of Massachusetts, have invented an Improvement in Rake-Cleaning Attachments, of which the following is a specification.

This invention relates to certain improvements in devices, or attachments, for cleaning the teeth of garden rakes, or for removing accumulations of grass, leaves, etc., which gather on the teeth and do not fall therefrom of their own weight.

The objects of my invention are to provide a simple and effective device for the above described purpose, which is adapted to be manufactured at small expense, which may be readily attached to any ordinary garden rake, such as is usually found in the market, without the employment of bolts, screws, or similar means, necessitating the use of tools, and may be readily removed, and is adapted to be readily operated by hand, or by striking a handle a slight blow with the foot when the rake is held in the ordinary position of use. I accomplish these objects by the means shown in the accompanying drawing, in which:—

Figure 1:
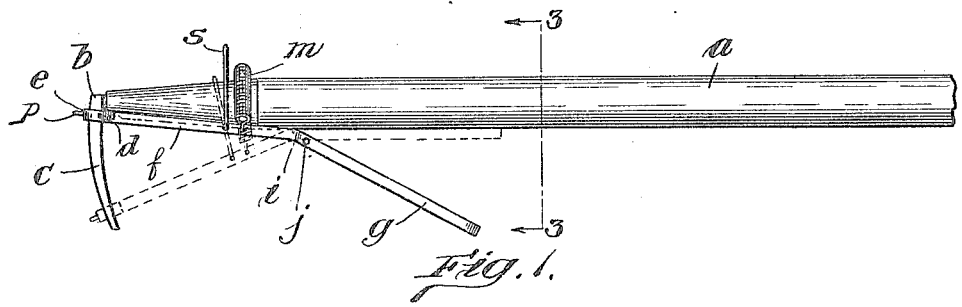
Figure 2:
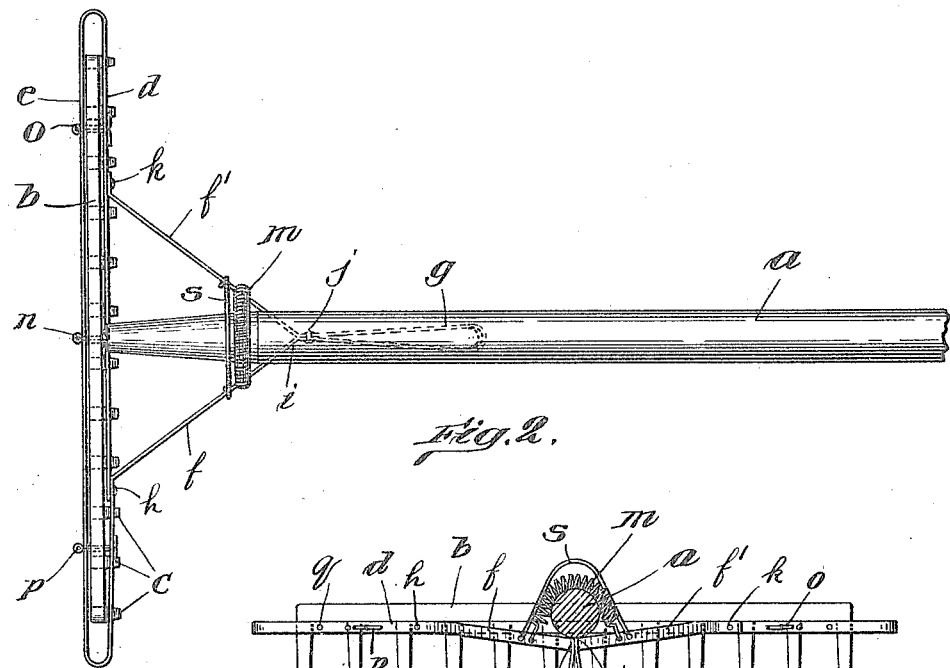
Figure 3:
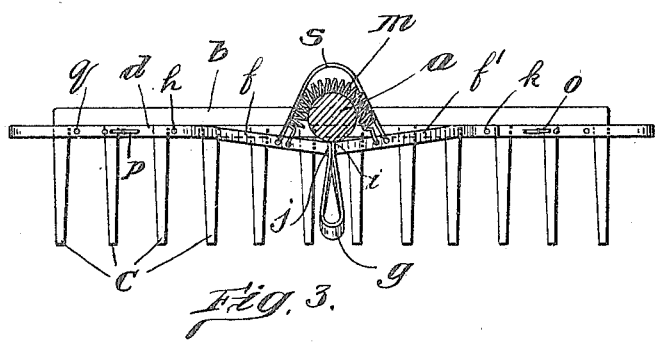

Figure 1 is a side elevation of a garden rake of common form, provided with an attachment embodying my invention. Fig. 2 is a plan view thereof. Fig. 3 is a sectional view taken at the line 3—3 of Fig. 1.

In the drawing, $a$ indicates the handle of an ordinary garden rake, and $b$ the head, or back bar thereof, having teeth $c$ projecting therefrom in the usual manner. As ordinarily constructed, the middle of the rake is midway between the space between two of the teeth, the other teeth being equally spaced therefrom.

According to my invention, I provide a pair of cleaning bars $d$ and $e$, which are adapted to extend in parallelism to the head $b$ at opposite sides of the teeth, and are connected at corresponding ends beyond the ends of the teeth. A pair of arms $f$, $f'$, are connected to the bar $d$, which is at the inner side of the teeth, or side next the handle $a$, at points approximately midway between the middle and the ends thereof, and said arms extend convergently and meet beneath the handle, from which point they are extended beneath the handle in an oblique direction relative to the plane of their converging portions, to form an operating handle $g$.

In practice, the above-described parts are all constructed from one continuous strip of flat metal of suitable width, said strip extending entirely about the teeth and overlapping adjacent one end, at which point the contacting portions are secured together by a rivet $h$, to form the bars $d$ and $e$. The strip is then extended obliquely from the bar $d$, just beyond the rivet $h$, to form the arm $f$, and the opposite end of the strip is connected to the bar $d$ at an opposite corresponding point, by a rivet $k$, and is extended convergently with the arm $f$, to form the arm $f'$. Both arms are then bent edgewise, and laterally, forming curved fulcrum portions $i$, which are adapted to bear against the underside of the handle $a$, and from which point they are extended in a loop to form the operating handle $g$, the sides of the strip, just beyond the bend, meeting and being held in contact by a rivet $j$, so that the curved fulcrum portions $i$ bear on the handle at opposite sides of the middle thereof. I further provide a coil spring $m$, which is designed to extend over the handle $a$, and to be connected at its ends to the arms $f$, $f'$, at points adjacent the points where said arms extend from beneath the handle $a$, between the fulcrum $i$ and the bar $d$, the end portions of the spring extending through apertures in said arms $f$, $f'$, and one of said end portions being made in hook form to permit ready attachment and detachment at one end. Cotter pins $n$, $o$, and $p$, are extended through the bars $d$ and $e$, between the rake teeth, the pin $n$ extending between the two teeth next adjacent the middle and the pins $o$ and $p$ extending between two teeth adjacent each end.

In applying the attachment to any ordinary garden rake, the teeth are passed between the bars $d$ and $e$, as indicated in Fig. 2, and, in case the end cotter pins should not happen to be in a position in which they are midway between two teeth, they will be moved to some such position, other apertures $q$ being provided for this purpose at different points in said bars. The bars are moved onto the teeth until the cotter pins engage the back bar of the rake, and the arms $f$ and $f'$ engage the under side of the handle at the fulcrum points $i$ therein. The spring $m$ is then bent over the handle and its hooked end is passed through an aperture in the arm $f$, as shown in Fig. 3; in which position it acts to hold the curved portions $i$ of the arms $f$, $f'$, firmly against the handle $a$ and the cotter pins against the back bar of the rake.

To operate the device, the handle $g$ is merely swung toward the rake handle, the arms $f$, $f'$, being swung on the intermediate curved portions $i$ as a fulcrum, so that they are carried away from the rake handle, causing the cleaning bars $d$ and $e$ to be carried transversely over the rake teeth toward the ends thereof, this movement being limited at the point where the operating handle engages the rake handle, as shown in the dotted position of Fig. 1. As this movement will be against the action of the spring $m$, when the handle $g$ is released, the spring will immediately draw the parts back to full line position of Fig. 1. If the teeth of the rake should happen to be especially short, so that the cleaning bars might be swung beyond the ends of the teeth, and possibly become misplaced, so that they would not return, a stop wire $s$ may be extended over the rake handle and connected to the arms $f$, $f'$, so as to limit the downward swinging movement of the bars at a point above the ends of the teeth. This stop wire is, however, unnecessary in most instances.

With the above-described device, when the rake is used in the ordinary way, if it is desired to remove the grass, etc., which may have accumulated upon the teeth, it is merely necessary for the user to force the operating handle inward toward the rake handle, sufficiently to move the bars down on the teeth a short distance, so that the accumulations will be removed. This may be readily done by lifting the rake sufficiently to permit the handle $g$ to be operated by hand, or, what may be more convenient, by striking the handle $g$ with the foot, at the end of the raking movement, a sharp blow of this sort usually being all that is necessary to dislodge all accumulations.

By arranging the fulcrum portions $i$ of the arms $f$, $f'$ so that the bearing is at each side of the middle of the rake handle, or so that said middle portion extends into the space between said arms, an important advantage is secured, in that the rake handle and spring $m$ hold the operating lever of the cleaning bars against lateral displacement. That is, the side of the handle is thereby enabled to resist relative lateral movement of the arms, and, in order that either arm $f$ or $f'$ may be moved down beneath the handle, the spring $m$ must be stretched. This arrangement makes it entirely unnecessary to provide any positive or additional means to prevent lateral displacement of the bar operating means.

The above-described form of pivotal connection permits longitudinal movement of the bar operating lever on the handle, which is advantageous for the following reason:— Commercial iron-toothed rakes are made in various forms, some with the teeth straight and practically perpendicular to the handle, and others with the teeth formed on various arcs, or inward curves with relation to the handle. It follows, therefore, that, unless the teeth are curved on an arc having its center approximately at the point at which the bar operating lever is pivoted, either one or the other cleaning bars will bind thereon and movement toward the ends of the teeth will be prevented to such an extent as to interfere with the proper performance of the functions thereof. With the above-described construction, however, if either cleaning bar should bind on the rake teeth before it was moved to its outer position, the force of engagement would cause the bar operating lever to slide on the rake handle, at the point of its pivotal engagement, to a sufficient extent to relieve the binding action, so that the bars may, in this way, be moved toward the ends of the teeth to the extent desired, the device being thus adapted to all forms of teeth which are ordinarily employed.

It will be noted that the above-described attachment in no way interferes with the use of the rake in any of the ordinary ways in which it is designed to be used. That is, the attachment does not interfere with the use of the rake teeth down, or with its use with its back bar $d$ resting on the ground and teeth up. The device is further adapted to be placed on the market as a separate article, which may be readily placed in position on any ordinary rake, without the use of bolts or screws. As constructed, it adds but slightly to the weight of the rake, and yet is very rigid, as all the strain thereon is edgewise of the metal strip. The device may also be manufactured at small expense.

I claim:—

1. A rake-tooth-cleaning attachment, comprising a cleaning bar adapted to extend transversely of the rake teeth, an arm extending therefrom, having a fulcrum portion arranged to engage the under side of the rake handle, an operating handle for said arm extending therefrom beyond said fulcrum portion, at an angle thereto, and a spring for connecting said arm and the rake handle between said fulcrum portion and said bar, yieldingly to hold said fulcrum portion in engagement with the rake handle and said bar in proximity to the rake-head.

2. A rake-tooth-cleaning attachment, comprising a cleaning bar adapted to extend transversely of the rake teeth, an arm extending therefrom, having a curved fulcrum portion arranged in rolling engagement with the under side of the rake handle, an operating handle continuous with said arm and extending obliquely therefrom beyond said fulcrum portion, and a spring for connecting said arm and the rake handle between said bar and said fulcrum portion, and arranged to yield to permit said bar to be swung transversely toward the ends of the rake teeth, and to permit longitudinal actuation of said arm by the engagement of the bar with the teeth.

3. A rake-tooth-cleaning attachment, comprising a cleaning bar adapted to extend transversely of the rake teeth, an arm extending therefrom, having a fulcrum portion arranged to engage the under side of the rake handle, an operating handle continuous with said arm and extending at an angle, therefrom, to permit it to swing with relation to the rake handle and permit said fulcrum portion to rock thereon, and a coil spring connected to said arm and adapted to be extended about the rake handle, to hold said fulcrum portion in engagement with the rake handle, and said bar in proximity to the head of the rake.

4. A rake-tooth-cleaning attachment comprising a cleaning bar adapted to extend transversely of the rake teeth, a pair of arms extending convergently from said bar at points disposed approximately equidistant from the middle of the bar and extending into proximity to each other in position to provide engaging portions for the under side of the rake-handle, an operating handle extending obliquely from said arms to permit the latter to swing on said engaging portion, and a coil spring adapted to be connected at its ends to said arms, respectively, between said engaging portions and said bar, and to extend over the rake handle.

5. In combination with a rake, a tooth-cleaning bar extending transversely of the rake teeth, an operating lever extending from said bar and having a fulcrum portion arranged to engage the under side of the rake handle, at opposite sides of the middle thereof, and a spring arranged normally to hold said fulcrum portion in engagement with the handle and said bar in an inoperative position.

6. In combination with a rake, a tooth-cleaning bar extending transversely of the rake teeth, a pair of arms extending from opposite portions of the bar into engagement with the under side of the rake handle at opposite sides of the middle thereof, and having a handle extending therefrom, to provide an operating lever fulcrumed at said points of engagement, and means for yieldingly holding said lever in said position of engagement and said bar in proximity to the base of the teeth.

7. In combination with a rake, a pair of tooth-cleaning bars disposed at opposite sides of the rake teeth in parallelism with the rake head, stop pins connected to said bars and extending between the rake teeth, a pair of arms extending from the bar next the rake handle into engagement with the under side of the handle, and then obliquely therefrom to form an operating handle, and a coil spring connected to the arms between their point of engagement with the rake handle and said bars and extending about the rake handle to hold said pins in engagement with the rake head and said arms in engagement with the rake handle.

8. In combination with a rake, a pair of cleaning bars extending in parallelism at opposite sides of the rake teeth, a lever connected to said bars at one end, and having an intermediate fulcrum portion arranged to bear against the under side of the rake-handle in sliding engagement therewith and an angularly disposed handle portion at the opposite end, and an elastic connection between the rake handle and the lever at a point between its fulcrum and the bar, to hold the bars in inoperative position and permit longitudinal movement of said lever when operated.

9. In combination with a rake, a cleaning bar extending transversely of the rake teeth, a pair of arms connected to said bar at opposite points with relation to the rake handle and extending convergently into engagement with the under side of the handle to provide a fulcrum, an operating handle extending at an angle thereto in position to permit said arms to swing on said fulcrum and a coil spring extending about said rake handle and having a detachable connection with said arms between said fulcrum and said bar.

10. In combination with a rake, a pair of cleaning bars extending transversely of the rake teeth at opposite sides thereof, an operating lever extending from said bars beneath the rake handle and arranged to be fulcrumed against the surface of the handle at an intermediate point in longitudinally sliding engagement therewith, and a spring arranged normally to hold said bars in proximity to the rake head, and to permit a combined swinging and longitudinal sliding movement of said lever when operated.

In testimony whereof, I have signed my name to this specification, in the presence of two subscribing witnesses.

GEORGE B. GARDNER.

Witnesses:
  L. H. HARRIMAN,
  GEO. MITCHELL, Jr.

Copies of this patent may be obtained for five cents each, by addressing the "Commissioner of Patents, Washington, D. C."